United States Patent [19]

Kellett et al.

[11] Patent Number: 4,544,119

[45] Date of Patent: Oct. 1, 1985

[54] BAR JOIST SUPPORTED SUSPENSION CLIPS

[76] Inventors: Roger N. Kellett, 4128 Currell Dr.; Clayton J. Hicks, 7816 Lawton Ave., NW., both of Lawton, Okla. 73505

[21] Appl. No.: 547,635

[22] Filed: Nov. 1, 1983

[51] Int. Cl.[4] .......................................... E21F 17/02
[52] U.S. Cl. ........................................ 248/58; 248/73; 248/217.3; 248/221.4; 248/317; 24/625; 24/295; 52/39
[58] Field of Search ............... 248/58, 214, 216.1, 248/216.4, 217.2, 217.3, 220.2, 221.3, 221.4, 317, 323, 324, 339, 340, 72, 73, 228, 544, 489; 24/615, 625, 295, 297, 453; 52/484, 485, 486, 489, 713, 39

[56] References Cited

U.S. PATENT DOCUMENTS

| | | | |
|---|---|---|---|
| 1,362,244 | 12/1920 | Farley | 248/59 |
| 1,726,500 | 8/1929 | Norris | 24/453 |
| 1,769,015 | 7/1930 | Carpenter | 248/317 |
| 2,112,247 | 3/1938 | McLoughlin | 24/615 |
| 3,014,564 | 12/1961 | Thomsen | 52/484 |
| 3,139,162 | 6/1964 | Spangenberg | 52/484 |
| 3,266,202 | 8/1966 | Furer | 52/39 |
| 3,390,856 | 7/1968 | Van Buren, Jr. | 248/317 |
| 3,558,091 | 1/1971 | Bush | 248/317 |
| 3,608,857 | 12/1969 | Hibbeler | 248/317 |
| 3,784,144 | 1/1974 | Ollinger et al. | 248/317 |
| 3,960,232 | 6/1976 | Hubbell | 248/58 |
| 4,041,668 | 8/1977 | Jahn | 52/489 |
| 4,409,707 | 10/1983 | Muraishi | 24/625 |

FOREIGN PATENT DOCUMENTS

| | | | |
|---|---|---|---|
| 630624 | 4/1963 | Belgium | 52/486 |
| 2260306 | 6/1974 | Fed. Rep. of Germany | 52/484 |
| 6400045 | 7/1964 | Netherlands | 52/484 |
| 885596 | 12/1961 | United Kingdom | 24/295 |
| 954732 | 4/1964 | United Kingdom | 52/484 |

Primary Examiner—J. Franklin Foss
Assistant Examiner—Robert A. Olson
Attorney, Agent, or Firm—Harvey B. Jacobson

[57] ABSTRACT

A stiff and resilient body is provided including a pair of upstanding arm portions having upper and lower ends. At least the upper ends of the arm portions are upwardly divergent in the static conditions thereof and the lower ends of the arms are joined together by a suspension structure for suspending a selected article therefrom. The upper ends of the arms include integral downwardly and oppositely outwardly inclined catch flanges supported therefrom with each arm upper end and the associated catch flange defining a downwardly opening channel on the outer side of the corresponding arm remote from the other arm upper end. The catch flanges are relatively downwardly divergent and include remote upwardly convergent outer side wedge surfaces for camming the upper ends of the arms toward each other as the clip is upwardly displaced between spaced flanges of a bar joist from therebelow to a level with the lower ends of the catch flanges disposed above the upper marginal edges of the flanges. The clip is sufficiently resilient to thereafter reassume the static upwardly divergent positions of the arms thereof, whereby the channels will be aligned with the upper marginal edges of the aforementioned flanges and seatingly receive the latter therein when the clip is subsequently slightly lowered relative thereto to thereby support the clip from the flanges.

6 Claims, 14 Drawing Figures

U.S. Patent  Oct. 1, 1985  Sheet 2 of 2  4,544,119

BAR JOIST SUPPORTED SUSPENSION CLIPS

BACKGROUND OF THE INVENTION

Various different forms of buildings are now being constructed through the utilization of bar joists due to the fact that bar joists enable the use of considerably greater unsupported span lengths at a relatively low cost. However, numerous different structures such as ducts, pipes and suspended ceiling T-bars must be suspended from bar joists when they are used. Accordingly, a need exists for structure by which pipes, T-bars, ducts as well as other structures may be conveniently suspended from bar joists.

Various different forms of suspension clips designed for use in suspending different structures from ceiling joists heretofore have been provided. Examples of these suspension clips are disclosed in U.S. Pat. Nos. 1,769,015, 3,266,202, 3,390,856, 3,558,091, 3,608,857 and 3,784,144.

However, these previously known forms of clips are not specifically designed for substantially failure-proof suspension from bar joists.

BRIEF DESCRIPTION OF THE INVENTION

The suspension clip of the instant invention comprises an upwardly opening generally U-shaped clip including upwardly divergent legs or arm portions terminating upwardly in outwardly and downwardly directed catch flanges including upwardly convergent remote outer side surfaces. The outer side surfaces define wedge surfaces by which the upper ends of the arms or legs may be cammed together upon upward displacement of the clips between laterally spaced vertical lower flanges of a bar joist and the clips are sufficiently resilient to enable the arms or legs thereof to again spring apart as the lower ends of the catch flanges are elevated above the upper edges of the vertical bar joist flanges. The upper ends of the arms or legs of the clip and the associated catch flanges define downwardly opening channels in which the upper marginal edges of the vertical flanges of the associated bar joist may be seated upon subsequent downward displacement of the clips relative to the bar joist. In this manner, the clips may be readily supportively engaged in a failure-proof manner from an associated bar joist.

The main object of this invention is to provide a suspension clip of multiple purpose duty which may be readily suspended from an associated bar joist in a failure-proof manner.

Another object of this invention is to provide a suspension clip which may be readily constructed of different sizes, as required.

Still another important object of this invention is to provide a suspension clip which does not require the use of tools for effecting supportive suspension thereof from an associated bar joist.

A final object of this invention to be specifically enumerated herein is to provide a bar joist suspension clip in accordance with the preceding objects and which will conform to conventional forms of manufacture, be of simple construction and easy to use so as to provide a device which will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is a fragmentary vertical sectional view taken substantially upon the plane indicated by the section line 5—5 of FIG. 4;

DETAILED DESCRIPTION OF THE INVENTION

Referring now more specifically to the drawings the numeral 10 generally designates each of a pair of conventional bar joists including upper and lower pairs of angle irons 12 between which alternately oppositely inclined bracing members 14 are secured. The bar joists 10 may be considered as conventional in construction.

Figure 2:
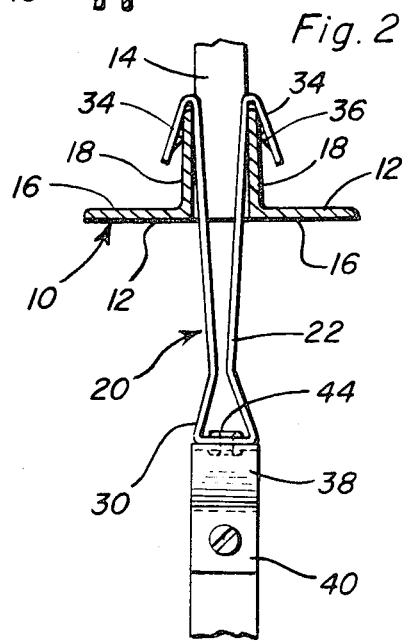
FIG. 2 is an enlarged fragmentary vertical sectional view taken substantially upon the plane indicated by the section line 2—2 of FIG. 1.

With attention now invited more specifically to FIG. 2 of the drawings, it may be seen that each of the lower angle irons 12 includes a lower horizontal flange 16 and a vertical flange 18 which projects upwardly from the corresponding horizontal flange 16. The vertical flanges 18 are slightly laterally spaced apart and project upwardly from the adjacent longitudinal edges of the horizontal flanges 16.

Figure 3:
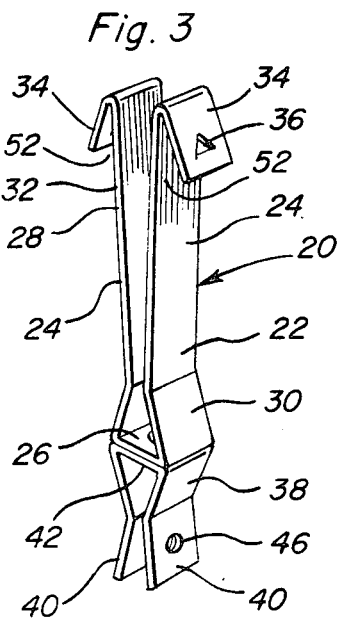
FIG. 3 is a perspective view of the suspension clip.
Figure 4:
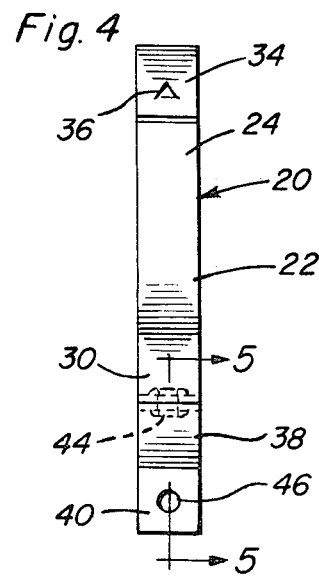
FIG. 4 is a side elevational view of the suspension clip.

A first form of suspension clip is referred to in general by the reference numeral 20 and defines an upwardly opening generally U-shaped strap member 22 including a pair of generally parallel arms or legs 24 interconnected at their lower ends by a horizontal transverse bight portion 26. The arms or legs 24 include downwardly divergent lower end portions 30 and upwardly divergent upper end portions 32 terminating upwardly in oppositely and outwardly downwardly directed inclined catch flanges 34. Each of the catch flanges 34 includes a laterally struck inwardly inclined triangular tooth 36 and the clip 20 is constructed of stiff and at least somewhat resilient material such as metal or strong plastic. Further, the clip 20 may be viewed in its static position in FIG. 3 of the drawings wherein the spacing between the lower ends of the catch flanges 34 is greater than the spacing between the opposing sides of the vertical flanges 18.

A downwardly opening generally inverted U-shaped suspension clamp 38 is supported from the bight portion 26 and includes a pair of generally parallel downwardly projecting legs 40 interconnected at their upper ends by a transverse bight portion 42 closely underlying the bight portion 26 and rotatably supported therefrom by a suitable fastener such as a rivet 44. A suitable clamp fastener (not shown) may be secured through apertures 46 formed in the lower ends of the legs 40 in order to support various structures from the suspension clamp 38. Further, the suspension clamp 38 may be adjustably angularly displaced relative to the bight portion 26 about a vertical axis, as desired.

Figure 1:
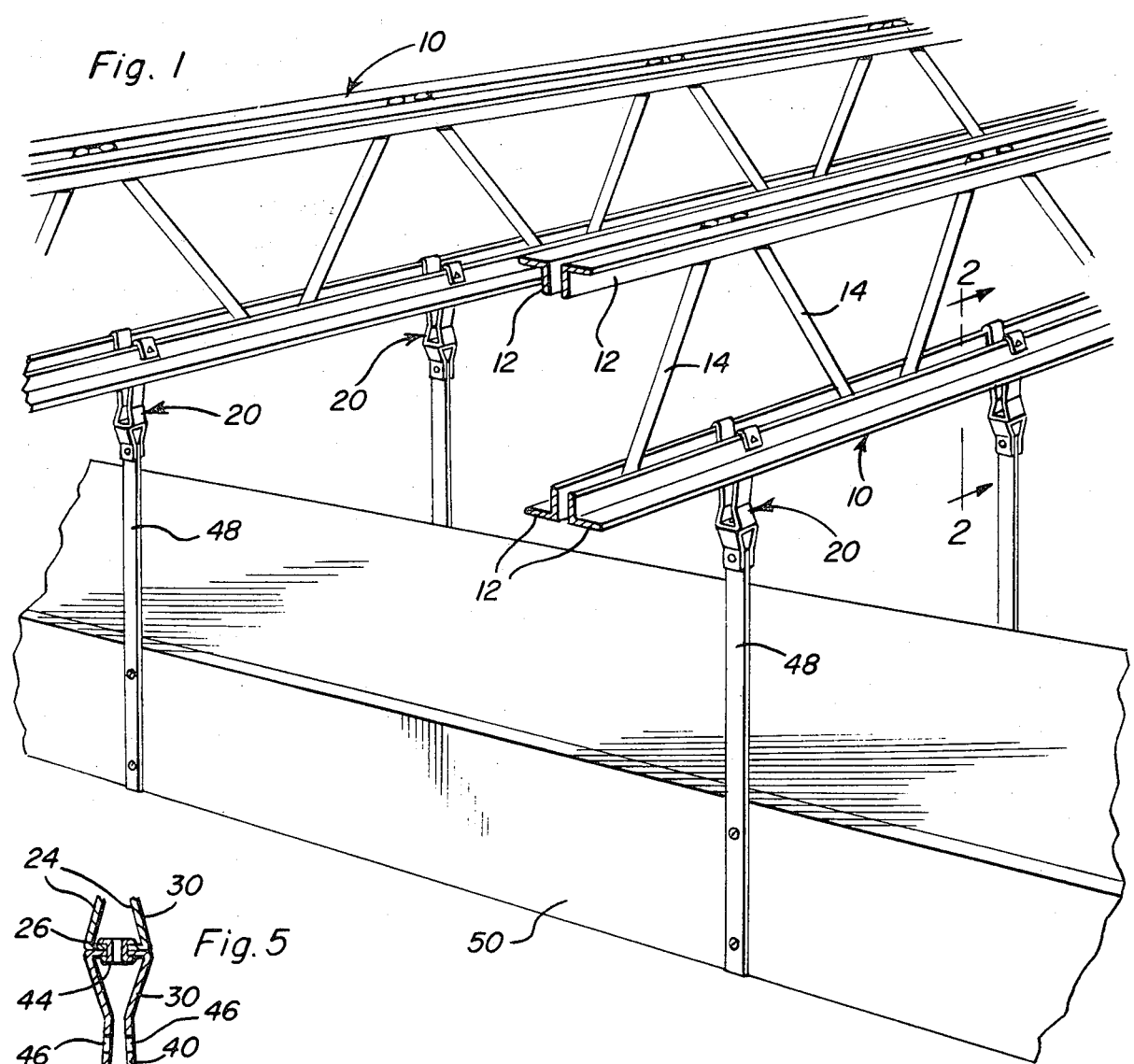
FIG. 1 is a perspective view of a pair of parallel bar joists or trusses each having a pair of suspension clips of the instant invention operatively associated therewith and with the suspension clips in use suspending an air passage duct from the bar joists.

In FIG. 1 of the drawings four clips 20 are illustrated supporting the opposite ends of a pair of suspension straps 48 from the bar joists 10 and an intermediate length portion of an air handling duct 50 is cradled and supported from the suspension straps 48.

When the suspension clips are to be engaged with the bar joists 10, they are upwardly displaced toward the lower angle members 12 and the remote upwardly convergent surfaces of the catch flanges 34 are received between the lower marginal edges of the vertical flanges 18 as the clips 20 are upwardly displaced relative to the bar joists 10. The remote surfaces of the catch flanges 34 serve to inwardly cam the upper ends of the arms or legs 24 together in order that the catch flanges 34 may be received between the flanges 18 and as soon as the clip 20 has been upwardly displaced sufficiently between the flanges 18 to elevate the lower marginal edges of the catch flanges 34 to a level above the upper marginal edges of the vertical flanges 18, the resiliency of the clip 20 allows the arms or legs 24 thereof to return to their static positions illustrated in FIG. 3 whereby the downwardly opening channels 52 defined between the upper ends of the arms 24 and the opposing catch flanges 34 may be registered with the upper marginal edges of the vertical flanges 18 and the clips 20 may thereafter be downwardly displaced relative to the angle members 12 in order to seatingly receive the upper marginal edges of the flanges 18 within the channels 52. The triangular laterally struck portions 36 serve to frictionally engage the remote surfaces of the flanges 18 and retain the clip 20 in its position upon the bar joist 10. Further, even if the weight applied to the clip 20 is sufficient to tend to straighten out the catch flanges 34, the laterally struck portions 36 will engage the outer sides of the upper marginal edges of the vertical flanges 18 to prevent downward movement of the clips 20 relative to the bar joist 10. Still further, should a sufficient downward force be applied to the clip 20 to slip the laterally struck portions 36 over the upper marginal edges of the flanges 18 upon partial straightening of the catch flanges 34, the upper ends of the arms or legs 24 will tightly abut each other in order to prevent the catch flanges 34 from being even further straightened. It also will be noted that in order for the upper end of the clip 20 to be upwardly received between the flanges 18, not only must the adjacent sides of arms 24 abut each other, but the free ends of the catch flanges 34 must be deflected toward the corresponding arms 24. This structure of applicant's invention, together with the laterally struck portions 36, ensures substantially fail safe operation of clips 20.

Figure 6:
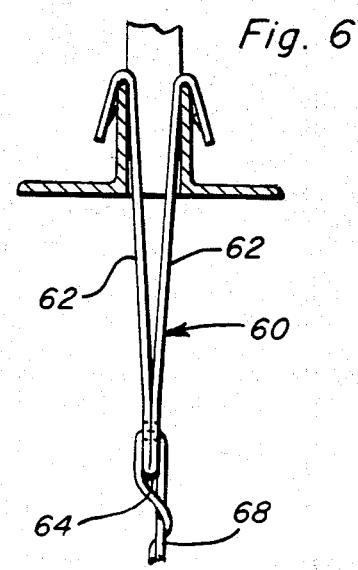
FIG. 6 is a fragmentary vertical sectional view similar to FIG. 2 but illustrating a second form of suspension clip.
Figure 7:
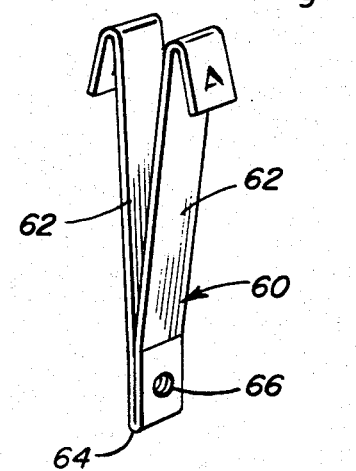
FIG. 7 is a perspective view of the second form of suspension clip.
Figure 8:
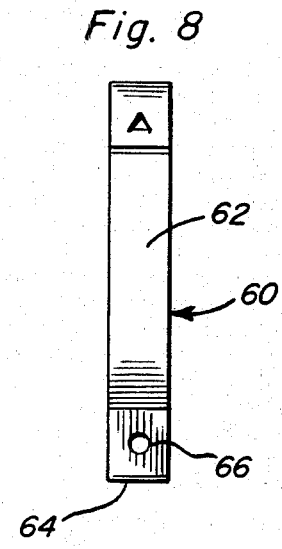
FIG. 8 is a side elevational view of the second form of suspension clip.

With attention now invited more specifically to FIG. 6 of the drawings, a second modified form of clip is referred to in general by the reference numeral 60. The clip 60 includes upwardly divergent arms or legs 62 corresponding to the arms or legs 24, but the lower ends of the arms or legs 62 are abutted against each other and joined by a reversely bent portion 64 of the strap material of which the clip 60 is constructed. In addition, the abutted lower end portions of the arms or legs 62 are provided with registered apertures 66 through which a suitable suspension wire 68 may be passed. Otherwise, the suspension clip 60 is identical to the suspension clip 20.

Figure 9:
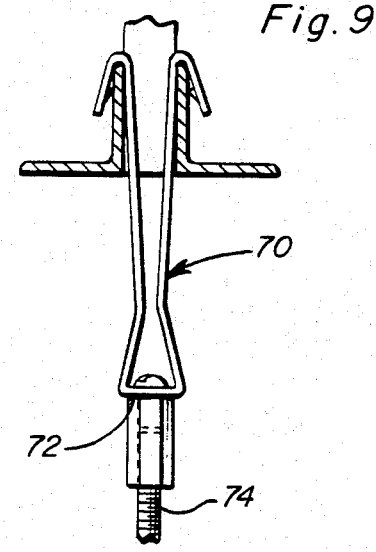
FIG. 9 is a fragmentary vertical sectional view similar to FIGS. 2 and 6 but illustrating a third form of suspension clip.
Figure 10:
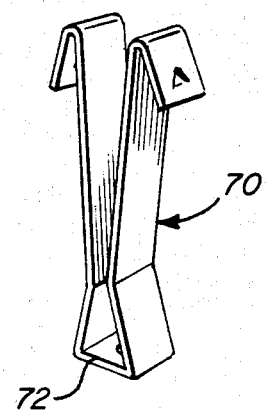
FIG. 10 is a perspective view of the third form of suspension clip.
Figure 11:
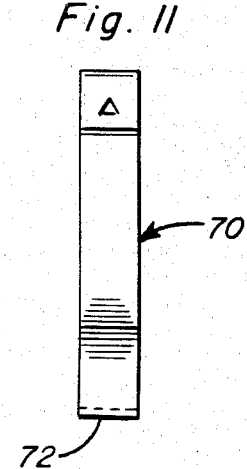
FIG. 11 is a side elevational view of the third form of suspension clip.

With attention now invited more specifically to FIGS. 9, 10 and 11, a third modified form of suspension clip is referred to in general by the reference numeral 70. The suspension clip 70 is substantially identical to the suspension clip 20, except that the lower end bight portion 72 thereof corresponding to the bight portion 26 merely has a suspension screw 74 secured therethrough.

Figure 12:
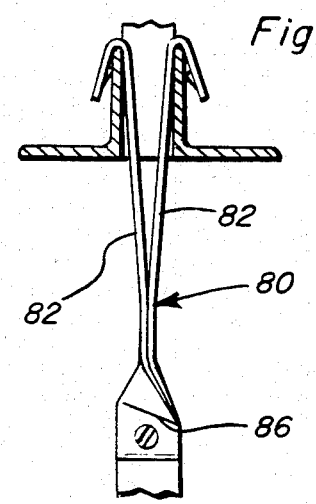
FIG. 12 is a fragmentary vertical sectional view similar to FIGS. 2, 6 and 9, but illustrating a fourth form of suspension clip.
Figure 13:
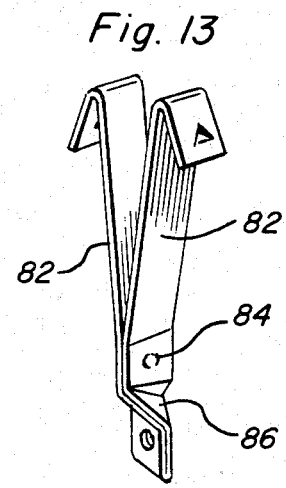
FIG. 13 is a perspective view of the fourth form of suspension clip.
Figure 14:
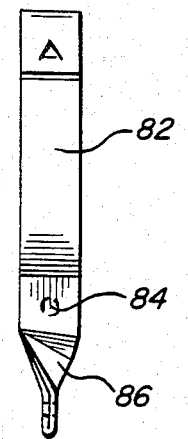
FIG. 14 is a side elevational view of the fourth form of suspension clip.

Finally, with attention invited more specifically to FIGS. 12, 13 and 14, a fourth modified form of suspension clip is referred to in general by the reference numeral 80. The suspension clip 80 is substantially similar to the suspension clip 60, except that the laterally abutted lower ends of the legs or arms 82 thereof corresponding to the legs or arms 62 are welded together as at 84 and twisted 90° as at 86. In this manner, the apertured lowermost ends of the arms 82 are displaced 90° relative to the apertured lower ends of the arms 62 of the clip 60.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a bar joist of the type including a pair of closely laterally spaced horizontally elongated upright flanges including exposed upper marginal edge portions, a resilient clip including a pair of upstanding arm portions having upper and lower ends, at least the upper ends of said arm portions being spaced apart in the static condition of said clip, means joining said lower ends and including suspension structure adapted to suspend a selected article therefrom, said upper ends of said arm portions including integral downwardly and oppositely outwardly inclined catch flanges supported therefrom with each arm portion upper end and the associated catch flange defining a downwardly opening channel on the outer side of the corresponding arm portion remote from the other arm portion upper end, said catch flanges being relatively downwardly divergent and including remote upwardly convergent outer side wedge surfaces for camming the upper ends of said arm portions toward each other as said clip is upwardly displaced between said flanges from therebelow to a level with the lower ends of said catch flanges disposed above said upper marginal edge portions, said clip being sufficiently resilient, after the upper ends of said arm portions have been cammed together for passage between said flanges, to reassume said static positions thereof, whereby said channels will be aligned with said upper marginal edge portions and seatingly receive the latter therein when said clip is subsequently slightly lowered relative to said flanges and said clip will be anchored to said flanges against further downward displacement relative thereto, the spacing between the remote sides of the lower ends of said catch flanges, when the upper ends of the opposing sides of said arm portions are abutted against each other, being at least slightly greater than the spacing between the adjacent sides of said upright flanges, whereby upward insertion of the upper ends of said arm portions between the adjacent sides of said upright flanges necessitates not only flexure of said arm portions to positions with the adjacent sides of the upper end portions thereof abutted together but also inward flexure of the lower ends of said catch flanges toward the opposing outer sides of said arm portions.

2. The suspension clip of claim 1 wherein said catch flanges include inwardly struck portions for frictional engagement with the remote side surfaces of said flanges.

3. The suspension clip of claim 1 wherein the lower ends of said arm portions are joined by a horizontal bight portion extending there between, said suspension structure including an inverted U-shaped clamp including an upper bight portion closely underlying the first-mentioned bight portion and pivotally anchored relative thereto for angular displacement about an upstanding axis.

4. The suspension clip of claim 1 wherein the lower ends of said arm portions laterally abut each other and are joined by a reversely bent lower terminal end, said laterally abutted lower end portions having registered apertures formed therethrough.

5. The suspension clip of claim 1 wherein the lower ends of said arm portions are joined by an integral transverse bight portion, and said suspension structure including a vertically disposed threaded suspension fastener secured through said bight portion.

6. The suspension clip of claim 1 wherein the lower end portions of said arm portions laterally abut each other and are welded together, the lower extremities of said laterally abutted lower end portions being twisted substantially 90° relative to the upper portions of said lower end portions.

* * * * *